United States Patent [19]
Shida et al.

[11] Patent Number: 6,164,353
[45] Date of Patent: Dec. 26, 2000

[54] PNEUMATIC TIRE FOR PASSENGER CARS HAVING SHOULDER RECESS

[75] Inventors: Zenichiro Shida; Riichiro Mama, both of Hiratsuka, Japan

[73] Assignee: The Yokohama Rubber Co., Ltd., Tokyo, Japan

[21] Appl. No.: 09/357,850

[22] Filed: Jul. 21, 1999

[51] Int. Cl.[7] .............................. B60C 3/00; B60C 11/01
[52] U.S. Cl. ...................................... 152/209.16; 152/454
[58] Field of Search ................................... 152/454, 523, 152/209.16

[56] References Cited

U.S. PATENT DOCUMENTS 5,205,978  4/1993  Ushikubo et al. .................. 152/454 X

*Primary Examiner*—Adrienne C. Johnstone
*Attorney, Agent, or Firm*—Arent Fox Kintner Plotkin & Kahn

[57] ABSTRACT

A pneumatic tire for passenger cars, having a carcass layer laid between left and right beads, and two belt layers provided in an outer peripheral side of the carcass layer in a tread, wherein a width of a second belt layer counted from the side of the carcass layer is set to 95–110% of a ground contacting width of the tread, a recess being provided in each shoulder so that the center of the recess is positioned in a region separate from a position of the shoulder which corresponds to an edge of the second belt layer toward a relative bead by a distance in the range of 8–14% of a width of the same belt.

8 Claims, 1 Drawing Sheet

PNEUMATIC TIRE FOR PASSENGER CARS HAVING SHOULDER RECESS

BACKGROUND OF THE INVENTION

This invention relates to a pneumatic tire promoting the reduction of the fuel consumption of a vehicle, and more particularly to a pneumatic tire for passenger cars which has enabled the reduction of its rolling resistance without spoiling the tire performance, such as the traveling performance on a wet road surface (wet performance) and an abrasion resistance.

In general, rubber of a large hysteresis loss is used for a cap tread of a pneumatic tire for passenger cars so as to secure the friction performance thereof. Meanwhile, it is necessary that rubber of a small hysteresis loss be used for improving the fuel consumption by reducing the rolling resistance of the tire.

However, when rubber blended with a fuel consumption reducing component, i.e. rubber of a small hysteresis loss is used for a cap tread so as to reduce the rolling resistance of the tire, the tire performance, such as wet performance and an abrasion resistance lowers. Although generally reducing the thickness of the cap tread is effective in reducing the rolling resistance of the tire, the life of the tire with respect to the abrasion thereof decreases in accordance with a decrease in the thickness of the cap tread, or the wet performance thereof decreases due to a decrease in the depth of grooves.

SUMMARY OF THE INVENTION

An object of the present invention is to provide a pneumatic tire for passenger cars which has enabled the reduction of its rolling resistance without spoiling the tire performance, such as the wet performance and an abrasion resistance.

To achieve this object, the present invention provides a pneumatic tire for passenger cars, having a carcass layer laid between left and right beads, and two belt layers provided in an outer peripheral side of the carcass layer in a tread, characterized in that a width of a second belt layer counted from the side of the carcass layer is set to 95–110% of a ground contacting width of the tread, a recess being provided in each shoulder so that the center of the recess is positioned in a region separate from a position of the shoulder which corresponds to an edge of the second belt layer toward a relative bead by a distance in the range of 8–14% of a width of the same belt.

Since a recess is thus provided in each shoulder so that the center of the recess is positioned in a region separate from the position of the shoulder which corresponds to the edge of the second belt layer toward the relative bead by the distance of 8–14% of the width of the same belt, the stress occurring in the shoulders during the rolling of the tire is lessened, and an energy loss occurring in a concentrated manner in these portions is effectively minimized, whereby a rolling resistance of the tire can be reduced. Accordingly, it becomes unnecessary to use rubber of a small hysteresis loss blended with a fuel consumption reducing component for the cap tread, so that a rolling resistance of the tire can be reduced without spoiling the tire performance, such as the wet performance and an abrasion resistance. Even when a recess is provided in each shoulder as mentioned above, with a width of the second layer specified with respect to a ground contacting width of the tread, and also with a distance specified by which the center of the recess is separate from the position of the shoulder corresponding to the edge of the second belt layer, it does not cause a decrease in the steering stability, durability of belt edge portions and a partial abrasion resistance in the shoulders.

According to the present invention, the ground contacting width of the tread is determined by imparting a load which corresponds to 75% of a maximum load capacity stipulated in the JATMA Year Book (1997 edition) to the tire at an air pressure of 200 kPa.

DETAILED DESCRIPTION OF THE PREFERRED EMBODIMETNS

Figure 1:
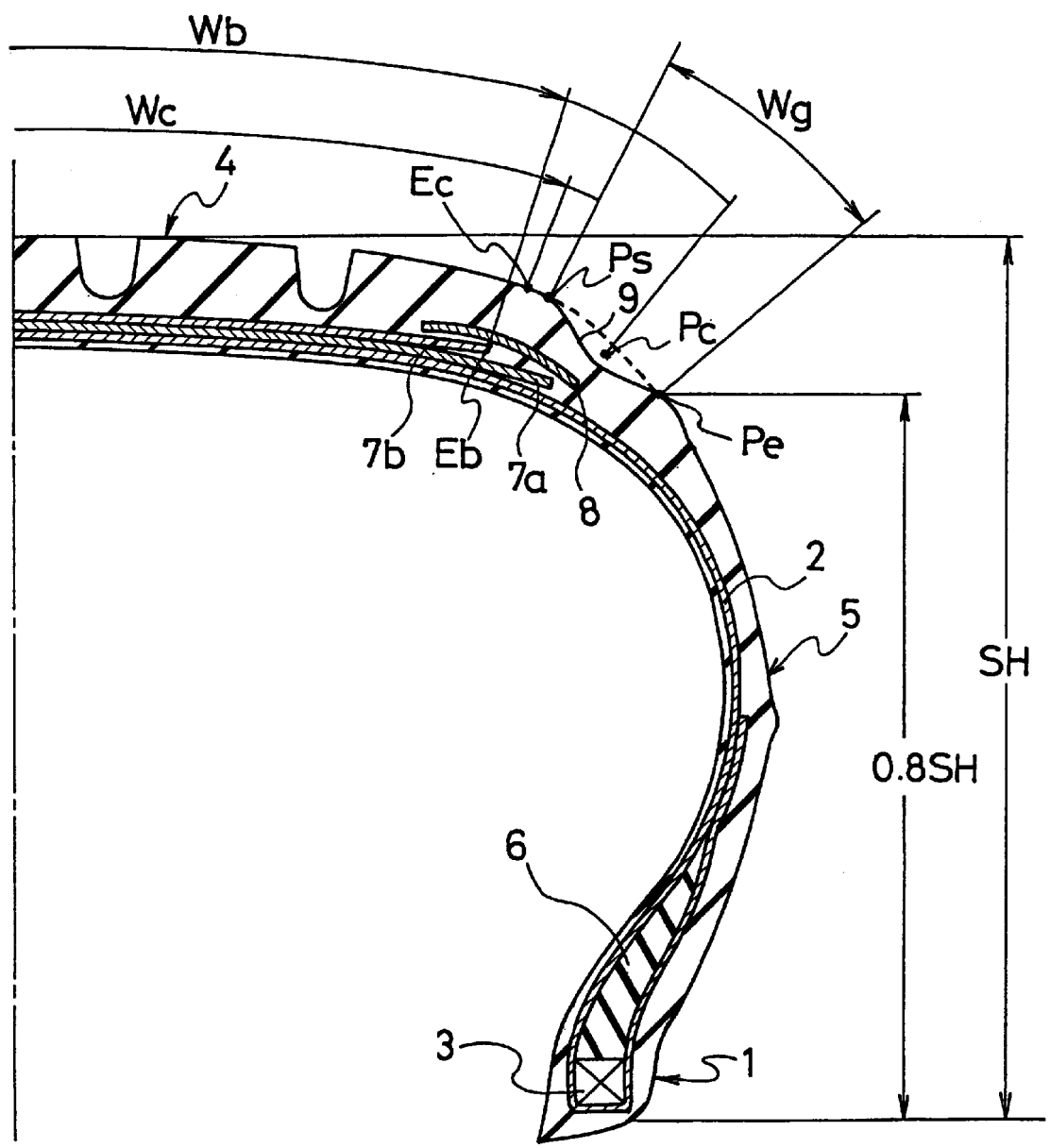
FIG. 1 is a half section of a mode of embodiment of the pneumatic tire for passenger cars according to the present invention taken along a vertical plane including a meridian thereof.

FIG. 1 illustrates a mode of embodiment of the pneumatic tire for passenger cars according to the present invention. Referring to the drawing, a carcass layer 2 in which a plurality of reinforcing cords are arranged in a radial direction of the tire is laid between left and right beads 1, 1, and both end portions of this carcass layer 2 with respect to a widthwise direction of the tire are wound up from an inner side of the tire to an outer side thereof around the respective bead cores 3. The left and right beads 1, 1 and a tread 4 are joined to each other via left and right side walls 5, 5. Bead fillers 6 are provided on outer peripheral sides of the bead cores 3, and enclosed with the carcass layer 2.

Two belt layers 7a, 7b each of which is formed by covering a plurality of reinforcing cords with coating rubber are provided in an outer peripheral side of the carcass layer 2 in the tread 4. The reinforcing cords in the belt layers 7a, 7b are inclined with respect to a circumferential direction of the tire so that the reinforcing cords in one belt layer cross those in the other. A belt covering layer 8 in which organic fiber cords of nylon or polyester are arranged in substantially parallel with the circumferential direction of the tire may be buried in each shoulder so as to cover at least relative edge portions of the belt layers 7a, 7b with respect to the widthwise direction of the tire.

In this pneumatic tire, a width Wb of a second belt layer 7b (measured along the tire contour as shown in FIG. 1) counted from the side of the carcass layer 2 is set to a level in the range of 95–110% of a ground contacting width Wc of the tread (also measured along the tire contour), and more preferably to a level in the range of 97–105% thereof. When the belt width Wb is less than 95% of the ground contacting width Wc of the tread, the rigidity of the portion of the tire which is in the vicinity of a ground contacting end thereof lowers, and a movement of the tread contacting the ground becomes large to cause partial abrasion to occur in the shoulder. Conversely, when the belt width Wb exceeds 110% of the ground contacting width Wc, a belt edge Eb enters the center of flexural deformation of the tread when the tread contacts the ground during the rolling of the tire, to cause the durability of the belt edge portion to lower.

A recess 9 is provided in the shoulder which is between the tread 4 and a side wall 5. It is necessary that the center Pc (center of the recess shown in the sectional view taken along a plane including a meridian of the tire) of this recess 9 be set in a region separate from the position of the shoulder corresponding to the edge Eb of the second belt layer 7b, the width Wb of which is set as mentioned above, toward the side of the bead 1 by a distance in the range of 8–14% of the belt width Wb. Setting the center Pc of the recess 9 in a position in such a range does not cause a decrease in the steering stability, the durability of the belt edge portions, a curb stone cutting resistance, and a partial abrasion resistance in the shoulders.

The embodiment will be described more concretely. A starting point Ps of the recess 9 on the side of a crown center is set in a region separate from a ground contacting end Ec toward a relative bead 1 by a distance of not less than 1.5% of the ground contacting width Wc. When the recess 9 is thus separate from the ground contacting end Ec, the ground contacting width does not decrease even during a cornering operation, so that a decrease in the steering stability can be prevented. When the recess 9 is separate from the ground contacting end Ec, it stops being influenced by the compressive stress in the direction of the ground contacting pressure. This enables the length of the recess 9 in the circumferential direction of the tire to be increased without causing the compressive strain to increase, and a rolling resistance to be further reduced. Accordingly, it is preferable that the recess 9 be continuous in the circumferential direction of the tire. The recess 9 may be formed intermittently in the circumferential direction of the tire. In such a case, a total length of the recess 9 in the circumferential direction of the tire is preferably set to not less than 50% of a circumferential length of the tire.

The starting point Ps of the recess 9 on the side of the crown center is set in a region separate from the position of the shoulder corresponding to the edge Eb of the second belt layer 7b toward the relative bead 1 by a distance of 3.5–7.5% of the belt width Wb. When the recess 9 is thus separate from the belt edge Eb, the center of flexural deformation, which occurs when the tread contacts the ground during the rolling of the tire, can be shifted from the belt edge portion in which failure is most liable to occur in the tire, so that the deterioration of the durability of the belt edge portion can be prevented. When the starting point Ps of the recess 9 is set in the above-mentioned position, the center of flexural deformation is shifted from the edge Eb, which constitutes the center of flexural deformation in a conventional tire of this kind, of the second belt layer 7b having larger thickness and volume, and the flexural deformation occurring during the rolling of the tire is effectively offset, so that the effect in reducing the rolling resistance can be improved. When the starting point Ps of the recess 9 is set in a position separate from the belt edge Eb toward the side of the relative bead 1 by a distance of over 7.5% of the belt width Wb, the effect in offsetting the flexural deformation in the vicinity of the belt edge portion decreases, so that the effect in reducing the rolling resistance becomes insufficient.

On the other hand, a terminal point Pe of the recess 9 on the side of the bead 1 is set in a region separate from a point of 70% of a cross-sectional height SH of the tire (measured radially as shown in FIG. 1) toward the side of the crown center. When the recess 9 is extended beyond this position toward the side of the bead 1, it reaches the side wall, causing an insufficient thickness of the side wall, so that the curb stone cutting resistance comes to lower. It is desirable that a width Wg of the recess (measured along the tire contour) be set to not less than 3 mm, and more preferably to not less than 5 mm. When the width Wg of the recess is less than 3 mm, the rolling resistance reducing effect becomes insufficient.

It is preferable that a maximum depth of the recess 9 be set to a level in the range of 15–80% of an average thickness of the portions of the tire which correspond to both end portions of the recess. When the maximum depth of the recess 9 is less than 15% of an average thickness of the portions of the tire which correspond to both end portions of the recess, the rolling resistance reducing effect becomes insufficient. According to the present invention, the starting point Ps of the recess 9 is separate from the belt edge Eb, so that the recess 9 can be made deep without caring about the possibility of occurrence of failure in the belt edge portions. However, when the maximum depth of the recess exceeds 80% of an average thickness of the portions of the tire which correspond to both end portions of the recess, cracks become liable to occur in the bottom of the recess 9, and the durability of the tire lowers. The average tire thickness mentioned above may be determined by measuring the thicknesses of the portions of the tire which correspond to the starting point Ps and terminal point Pe of the recess 9, and halving the sum thereof devided by two.

When as described above the width Wb of the second belt layer 7b is set to a level in the range of 95–110% of the ground contacting width Wc of the tread with the recess 9 provided in the shoulder so that the center Pc of the recess 9 is separate from the edge Eb of the second belt layer 7b toward the side of the relative bead 1 by a distance of 8–14% of the belt width Wb, it becomes possible to lessen the stress occurring in the shoulder during the rolling of the tire without causing a decrease in the steering stability, the durability of the belt edge portions and a partial abrasion resistance in the shoulders, effectively minimize an energy loss occurring in the shoulders in a concentrated manner, and thereby reduce the rolling resistance. This makes it unnecessary to use rubber of a small hysteresis loss blended with a fuel consumption reducing component for the cap tread, so that the rolling resistance can be reduced without spoiling the tire performance, such as the wet performance and abrasion resistance.

According to the present invention, it is preferable to provide the belt covering layers 8 of organic fiber cords so as to cover at least both edge portions of the belt layers 7a, 7b with respect to the widthwise direction of the tire. When the belt covering layers 8 are provided in this manner, the rigidity of the belt edge portions is improved to enable the flexural deformation of the belt edge portions occurring when the tire contacts the ground during the rolling thereof to be effectively minimized. Accordingly, the improvement of the durability of the belt edge portions and the reduction of the rolling resistance can be attained.

EXAMPLE

A number of pneumatic tires for passenger cars of a Conventional Example, Comparative Examples 1–5 and Embodiments 1–7 which had a size of 185/65R14 and construction shown in FIG. 1 were manufactured with the following factors set differently; the presence or absence of recesses extending in the shoulders continuously in the circumferential direction of the tires, the width Wb of the second belt layer, the center Pc of the recesses, the starting point Ps of the recesses, the terminal points Pe of the recesses, the width Wg of the recesses, the maximum depth of the recesses, and the presence or absence of the belt covering layers covering the belt ends.

The belt width Wb is represented by a ratio (%) thereof to the ground contacting width Wc, the center Pc of a recess by a ratio (%) of a distance by which the center is separate from the belt edge Eb toward the side of the relative bead to the belt width Wb, the starting point Ps(1) of the recess by a ratio (%) of a distance by which this starting point is separate from the ground contacting end Ec toward the relative bead to the ground contacting width Wc, the starting point Ps(2)

of the recess by a ratio (%) of a distance by which this starting point is separate from the belt edge Eb toward the side of the relative bead to the belt width Wb, the terminal point Pe of the recess by a ratio (%) thereof to the cross-sectional height SH of the tire, and the maximum depth of the recess by a ratio (%) thereof to the average thickness of the portions of the tire which correspond to both end portions of the recess.

Concerning these test tires, the rolling resistance, steering stability, durability of belt edge portions, partial abrasion resistance in shoulders and scratch resistance were evaluated by the following testing methods, and the results were shown in Table 1.

Rolling resistance:

Each test tire was set on a wheel of a rim size of 14×5·½ JJ with the air pressure thereof set to 200 kPa. The resultant wheel was mounted on a drum test machine, and then made to travel as the ambient temperature was controlled to 23±2°, with the outer circumferential surface of a steel drum of 1707 mm in diameter with a smooth surface, rotated at a speed of 80 km, to determine the rolling resistance. The results of the evaluation were shown by indexes based on 100 representing the result of the Conventional Example. The smaller indexes represent smaller rolling resistance.

Steering stability:

Each test tire was set on a wheel of a rim size of 14×5·½ JJ with the air pressure thereof set to 200 kPa. The resultant wheel was mounted on an FF passenger car with a displacement of 1.6 liter, and the resultant car was made to travel on a test course by five trained test drivers to evaluate the riding comfort. The results were marked by a 5-point method based on the following judgement basis in relative comparison with the result of the Conventional Example. The grades were shown by numbers obtained by averaging the marks given by three drivers with the maximum and minimum marks given by the remaining two eliminated. Larger marks represent higher steering stability. The judgement was made on the basis of 5: splendid, 4: superior, 3.5: fair, 4: equal to a standard level, 2.5: somewhat inferior (lower practical limit), 2: bad, and 1: very bad.

Durability of belt edge portions:

Each test tire was set on a wheel of a rim size of 14×5·½ JJ with the air pressure thereof set to 180 kPa. The resultant wheel was mounted on a drum test machine, and then made to travel as the ambient temperature was controlled to 38±3° C., with the outer circumferential surface of a steel drum of 1707 mm in diameter with a smooth surface, rotated at a speed of 81 km with a load of 4.42 kN for 4 hours, then with a load of 4.68 kN for 6 hours, and thereafter with a load of 5.20 kN for 24 hours. The traveling of the wheel was then once stopped, and, when abnormality was not found in the outer appearance of the tire, the wheel was further made to travel with a load of 5.98 kN for 4 hours, and then with a load of 6.76 kN for 2 hours. The tires in which failure occurred at this point in time were determined as unsatisfactory (X) tires, and the tires in which failure did not occur satisfactory (O) tires. The satisfactory tires were subjected to further traveling with a load of 6.76 kN for 2 hours, then with a load of 7.28 kN for 4 hours, and thereafter with a load of 8.32 kN for 4 hours. The tires in which failure did not occur in the outer appearances and the inner portions thereof were determined as satisfactory (⊚) tires.

Partial abrasion resistance in shoulders:

Each test tire was set on a wheel of a rim size of 14×5·½ JJ with the air pressure thereof set to 200 kPa. The resultant wheel was mounted on a front axle of a small-sized passenger car with a displacement of 1.6 liter, and the resultant car was made to travel 10000 km on a test course. The abrasion rates (abrasion losses with respect to a depth of grooves of an unused tire of this kind) of the shoulders and a central portion were measured to determine a ratio thereof. The results were evaluated; the tires in which a ratio of the abrasion rate of the shoulders to that of the central portion was not lower than 1.5 and those lower than 1.5 were determined as unsatisfactory (X) tires and satisfactory (O) tires respectively. This test was not applied to the tires which gained unsatisfactory marks in the other tests.

Scratch resistance:

Each test tire was set on a wheel of a rim size of 14×5·½ JJ with the air pressure thereof set to 200 kPa. The resultant wheel was mounted on a small-sized passenger car with a displacement of 1.6 liter, and the resultant car was made to run over a steel curb stone of 100 mm in height at an angle of approach of 30°. The speed of the car at this time was varied from 10 km/h in a stepped manner with 1.0 km/h at a time, and a critical speed at which the tire was not burst was checked three times. The scratch resistance of the tire was evaluated on the basis of an average value of the critical speeds. The results were evaluated; the tires in which an average value of the critical speeds was lower than that of the Conventional Example and those equal to or higher than that of the Conventional Example were determined as unsatisfactory (X) tires and satisfactory (O) tires respectively.

TABLE 1

|  | Conventional Example | Comparative Example 1 | Comparative Example 2 | Comparative Example 3 | Comparative Example 4 | Comparative Example 5 | Embodiment 1 |
| --- | --- | --- | --- | --- | --- | --- | --- |
| Presence or absence of recesses | Absent | Absent | Absent | Present | Present | Present | Present |
| Belt width Wb (%) | 100 | 94 | 112 | 95 | 110 | 95 | 100 |
| Center Pc of each recess (%) | — | — | — | 6 | 6 | 27 | 8 |
| Starting point Ps (1) of each recess (%) | — | — | — | 1.0 | 1.5 | 16.0 | 3.5 |
| Starting point Ps (2) of each recess (%) | — | — | — | 3.5 | 1.0 | 19.0 | 3.5 |
| Terminal point Pe (%) | — | — | — | 87 | 80 | 65 | 84 |
| Width Wg of each recess (mm) | — | — | — | 12 | 15 | 22 | 8 |
| Maximum depth of each recess (%) | — | — | — | 60 | 60 | 30 | 60 |
| Presence or absence of belt covering layers | Absent | Absent | Absent | Absent | Absent | Absent | Absent |

TABLE 1-continued

| | | | | | | | |
|---|---|---|---|---|---|---|---|
| Rolling resistance | 100 | 99 | 101 | 96 | 97 | 98 | 96 |
| Steering stability | 3.0 | 2.8 | 3.2 | 2.7 | 3.0 | 3.0 | 3.0 |
| Durability of each belt edge portion | ◯ | ◯ | X | ◯ | X | ◯ | ◎ |
| Partial abrasion resistance in each shoulder | ◯ | X | Not examined yet | Not examined yet | Not examined yet | ◯ | ◯ |
| Scratch resistance | — | ◯ | ◯ | ◯ | ◯ | X | ◯ |

| | Embodiment 2 | Embodiment 3 | Embodiment 4 | Embodiment 5 | Embodiment 6 | Embodiment 7 |
|---|---|---|---|---|---|---|
| Presence or absence of recesses | Present | Present | Present | Present | Present | Present |
| Belt width Wb (%) | 110 | 95 | 100 | 100 | 100 | 100 |
| Center Pc of each recess (%) | 14 | 14 | 12 | 12 | 9 | 12 |
| Starting point Ps (1) of each recess (%) | 13.0 | 4.5 | 4.0 | 4.0 | 75 | 4.0 |
| Starting point Ps (2) of each recess (%) | 7.5 | 7.5 | 4.0 | 4.0 | 7.5 | 4.0 |
| Terminal point Pe (%) | 70 | 80 | 80 | 80 | 86 | 80 |
| Width Wg of each recess (mm) | 20 | 17 | 16 | 16 | 3 | 16 |
| Maximum depth of each recess (%) | 60 | 60 | 80 | 15 | 60 | 60 |
| Presence or absence of belt covering layers | Absent | Absent | Absent | Absent | Absent | Present |
| Rolling resistance | 96 | 97 | 95 | 98 | 98 | 93 |
| Steering stability | 3.0 | 3.0 | 3.0 | 3.0 | 3.0 | 3.0 |
| Durability of each belt edge portion | ◯ | ◯ | ◯ | ◯ | ◎ | ◎ |
| Partial abrasion resistance in each shoulder | ◯ | ◯ | ◯ | ◯ | ◯ | ◯ |
| Scratch resistance | ◯ | ◯ | ◯ | ◯ | ◯ | ◯ |

Table 1 clearly shows that, in Comparative Example 1, in which the belt width Wb was small, the partial abrasion resistance in the shoulders was deteriorated and the steering stability also decreased. In Comparative Example 2, the durability of the belt edge portions lowered since the belt width Wb was large. In Comparative Example 3, the steering stability lowered since the center Pc of each recess was separate from the belt edge Eb by a distance of 6% of the belt width Wb. In Comparative Example 4, the durability of each belt edge portion lowered since the center Pc of each recess was separate from the belt edge Eb by a distance of 6% the belt width Wb. In Comparative Example 5, the scratch resistance lowered since the center Pc of each recess was separate from the belt edge Eb by a distance of 27% of the belt width Wb.

On the other hand, in Embodiments 1–6, the rolling resistance decreased without spoiling the steering stability, the durability of the belt edge portions and the partial abrasion resistance in the shoulders since they have recesses of a predetermined size in the shoulders. In Embodiment 7, the rolling resistance reducing effect increased without spoiling the steering stability, the durability of the belt edge portions and the partial abrasion resistance in the shoulders since it was provided with recesses of a predetermined size in the shoulders and belt covering layers which covered the belt edge portions.

What is claimed is:

1. A pneumatic tire for passenger cars, having a carcass layer laid between left and right beads, and two belt layers provided in an outer peripheral side of said carcass layer in a tread, wherein a width of a second belt layer counted from the side of said carcass layer and measured along a tire contour is set to 95–110% of a ground contacting width of said tread measured along the tire contour, a recess being provided in each shoulder so that the center of said recess is positioned in a region separate from a position of said shoulder which corresponds to an edge of said second belt layer toward a respective bead by a distance in the range of 8–14% of a width of the second belt.

2. A pneumatic tire for passenger cars according to claim 1, wherein said recess extends continuously in the circumferential direction of said tire.

3. A pneumatic tire for passenger cars according to claim 1, wherein a starting point of said recess on the side of a crown center is set in a region separate from a ground contacting end toward a respective bead by a distance measured along the tire contour of not less than 1.5% of said ground contacting width of said tread.

4. A pneumatic tire for passenger cars according to claim 1, wherein a starting point of said recess on the side of a crown center is set in a region separate from the position of said shoulder corresponding to the edge of said second belt layer toward said bead by a distance measured along the tire contour of 3.5–7.5% of said second belt width.

5. A pneumatic tire for passenger cars according to claim 1, wherein a terminal point of said recess on the side of said bead is set in a region separate from a point of 70% of a cross-sectional height of said tire toward a crown center measured in a radial direction of the tire.

6. A pneumatic tire for passenger cars according to claim 1, wherein a width of said recess measured along the tire contour is set to not less than 3 mm.

7. A pneumatic tire for passenger cars according to claim 1, wherein a maximum depth of said recess is set to 15–80% of an average thickness of the portions of said tire which correspond to both end portions of said recess.

8. A pneumatic tire for passenger cars according to claim 1, wherein at least both edge portions of said belt layers are covered with belt covering layers of organic fiber cords.

* * * * *